United States Patent Office 3,553,278
Patented Jan. 5, 1971

3,553,278
PROCESS FOR THE DISPROPORTIONATION OF TOLUENE
Masaki Sato, Kamakura-shi, and Seiya Otani, Ohtsu-shi, Japan, assignors to Toyo Rayon Kabushiki Kaisha, Tokyo, Japan, a corporation of Japan
Filed Dec. 5, 1968, Ser. No. 781,501
Claims priority, application Japan, Dec. 7, 1967, 42/78,197
Int. Cl. C07c *3/58;* C01b *33/28;* B01i *11/78*
U.S. Cl. 260—672
17 Claims

ABSTRACT OF THE DISCLOSURE

A process for the preparation of benzene and xylene by the disproportionation of toluene by contacting toluene in the presence of hydrogen under heating with a catalyst which is prepared by mixing a dealkalized clinoptilolite with an aluminum fluoride having a crystallite size of less than 1700 A. before the mixing for the preparation of the catalyst. The catalyst may contain copper or silver as the third component.

---

This invention relates to the disproportionation of toluene to benzene and xylene by demethylating a part of toluene and concurrently methylating another part of toluene by the vapor-phase catalytic heterogeneous reaction.

Recently, with the increase of the productions of synthetic fibers, particularly polyester and polyamide type synthetic fibers, demand for benzene and xylene has been increased. Therefore, the so-called disproportionation process for converting toluene to benzene and xylene had been industrially examined in various ways. With reference to alkyl aromatic hydrocarbons, various disproportionation processes have been proposed heretofore. Most of these processes use Friedel-Crafts catalysts. Further, there have been reported other various processes using as catalyst silica-alumina, alumina-boria, or crystalline zeolite known as molecular sieve.

However, all of these known catalysts exhibit only a low catalytic activity to the disproportionation reaction of toluene and further, they have shortcomings such as a short life and an extreme deposition of carbon on the catalyst. Therefore, any of these known catalysts cannot be a sufficient catalyst usable for the industrial disproportionation of toluene.

In view of such state of the art, we have made various attempts to develop novel catalysts which are capable of disproportionating toluene with high conversion and yield, have a long life and are greatly improved with respect to the deposition of unnecessary carbon. As a result we have found novel disproportionation catalysts excellent in the catalytic activity and arrived at this invention.

This invention provides a process for the preparation of benzene and xylene by the disproportionation of toluene comprising contacting toluene with a catalytic amount of a catalyst under heating, characterized in that the catalyst is prepared by mixing a dealkalized clinoptilolite with an aluminum fluoride, the said aluminum fluoride having a crystallite size of less than 1700 A. before the mixing for the preparation of the catalyst, and that the said disproportionation is carried out in the presence of hydrogen.

This invention provides also a process for the preparation of benzene and xylene by the disproportionation of toluene comprising contacting toluene with a catalytic amount of a catalyst under heating, characterized in that the catalyst is prepared by mixing a dealkalized clinoptilolite and an aluminum fluoride with at least one member selected from the group consisting of copper and silver, the said aluminum fluoride having a crystallite size of less than 1700 A. before the mixing for the preparation of the catalyst and that the said disproportionation is carried out in the presence of hydrogen.

Figure 1:
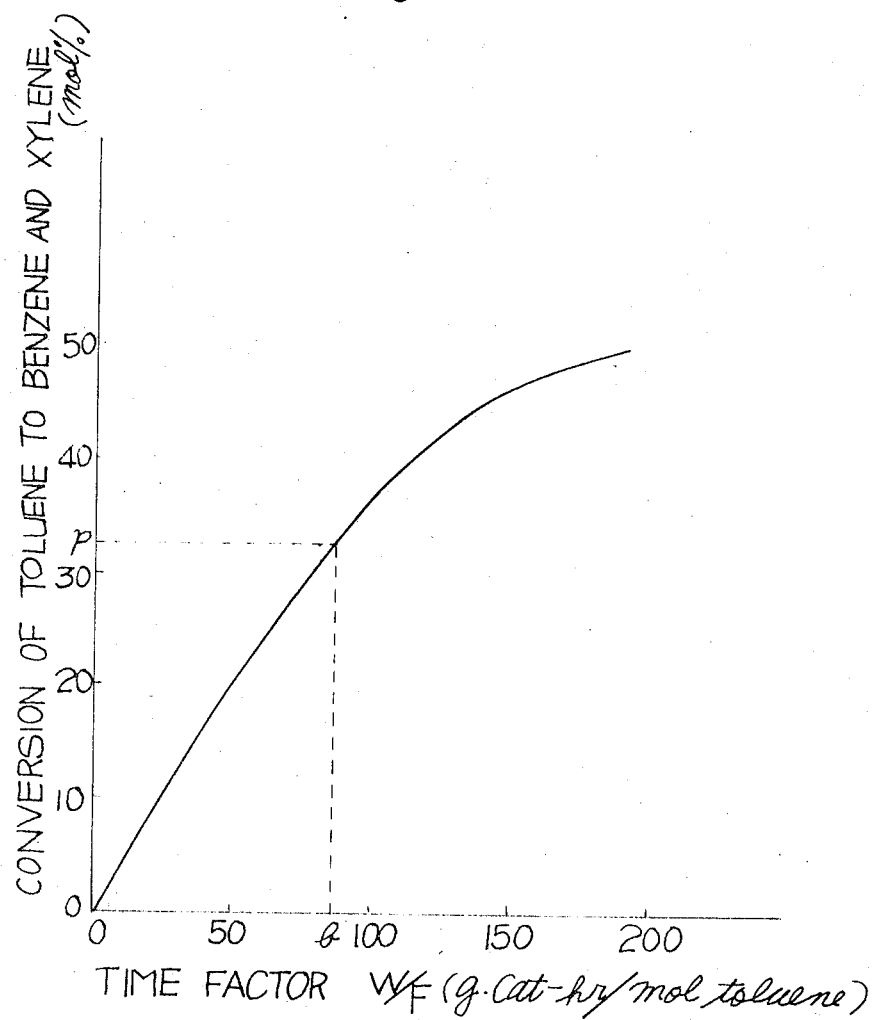
Figure 2:
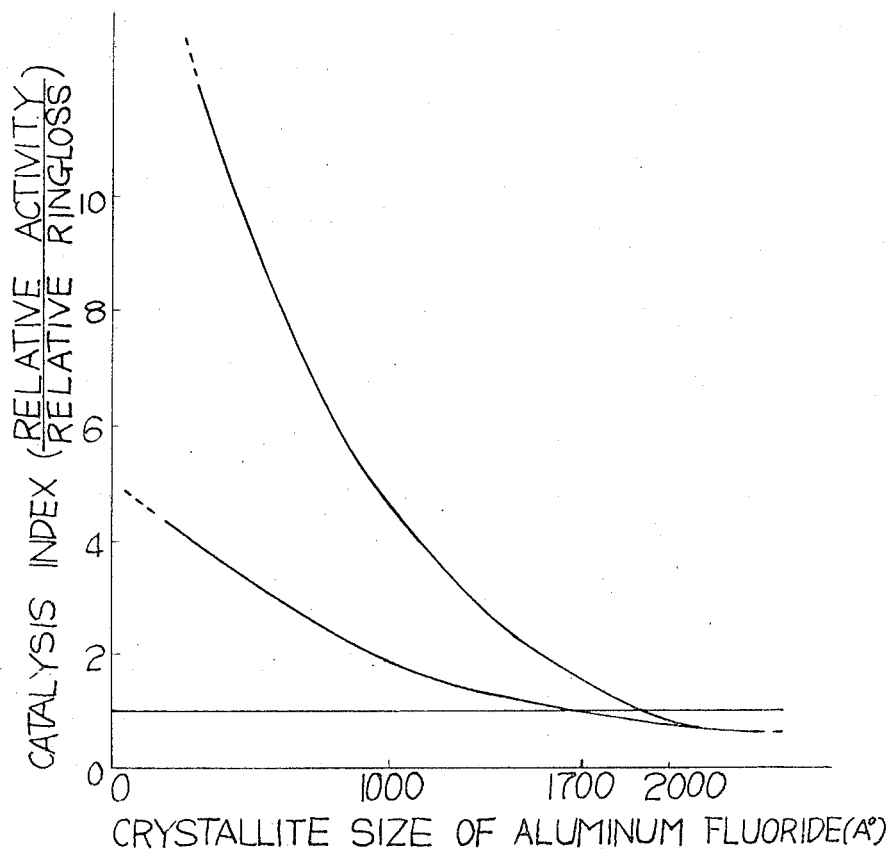

FIG. 1 is a graph illustrating the relation between the time factor ($W/F$) and the conversion of toluene to benzene and xylene when the disproportionation of toluene is performed by employing the standard catalyst consisting only of a dealkalized clinoptilolite. FIG. 2 is a graph illustrating the catalytic properties of the catalyst of this invention and the above mentioned standard catalyst.

The term "clinoptilolite" used in the specification and claims of this invention means a kind of zeolite which consists predominantly of a crystalline, hydrated alkali claims of this invention means a kind of zeolite which imparts a characteristic spectrum in the vicinity of $2\theta = 11.0$ in the X-ray diffraction spectrum by the CuK$\alpha$ line.

The clinoptilolite used in this invention involves either natural or synthesized clinoptilolites. As the natural clinoptilolite there are cited Otani stone produced in Toyohama layer of Chita peninsula, Aichi prefecture, Japan; the clinoptilolite produced at Itatani, Yamagata prefecture, Japan; Hector California produced in California, U.S.A.; and the clinoptilolite produced in Patagonia, Argentina.

Crystalline zeolites known as molecular sieve have been conventionally used as catalysts for the disproportionation of hydrocarbons by cracking or alkylation. In the conventional methods employing such crystalline zeolites, is is required that the catalysts should have a uniform porous structure, and the catalytic activity of these catalysts was deemed to be due to such porous structure. On the other hand, it must be noted that the clinoptilolite to be used in this invention should not always have a uniform porous structure.

The dealkalized clinoptilolite, the first component of the catalyst of this invention is obtained by subjecting the above described clinoptilolite to a dealkalizing treatment. The dealkalizing treatment referred to herein means a treatment of substituting alkali metals or alkaline earth metals contained in the clinoptilolite by hydrogen. The degree of the dealkalization can be measured by the conventional analytical means such as atomic adsorption spectophotometry. With reference to the degree of the dealkalization in the dealkalized clinoptilolite of the catalyst of this invention, more than 50 mol percent, preferably more than 90 mol percent of the whole alkali metals and alkaline earth metals contained in an untreated clinoptilolite are substituted by hydrogen. The dealkalizing treatment is performed by pulverizing a clinoptilolite according to need, treating it with an aqueous solution of 1–6 N of an inorganic acid such as hydrochloric acid, sulfuric acid, nitric acid and phosphoric acid, or an organic acid such as formic acid and acetic acid, and thereby substituting alkali metals or alkaline earth metals directly by hydrogen. In this case, the treatment may be performed at room temperature, but it is preferred to carry out the treatment at elevated temperatues of 80 to 100° C. The treating time varies depending on the treating temperature and the concentration of the treating aqueous solution, but generally, it is in the range of from 1 to 6 days. The other preferred method of the dealkalizing treatment comprises pulverizing a clinoptilolite according to need, treating it with an aqueous solution of an ammonium compound such as ammonium chloride or amonium nitrate having a concentration of 1 to 30% by weight, preferably 5 to 15% by weight, to substitute alkali metals or alkaline earth metals by $NH_4^+$, and thereafter subjecting the so treated clinoptilolite to a heat treatment at 300 to 650° C. to form the hydrogen-substituted product by removal of ammonia. The treatment with such ammonium compound aqueous solution may be performed at room temperature, but it is preferred to carry out the treatment at 80 to 100° C. A preferred treatment time is in the range of from 1 to 6 days. This method is also preferably applied to the dealkalizing treatment. As the dealkalizing agent to be used in this invention particularly preferable are hydrochloric acid, nitric acid and ammonium chloride. The clinoptilolite treated with an aqueous solution of the dealkylizing agent is then washted with water sufficiently, dried at 120 to 150° C. and blended with an aluminum fluoride.

The aluminum fluoride, the second component of the catalyst of this invention should have a crystallite size of less than 1700 A. before mixing for the preparation of the catalyst. The recrystallite size of the aluminum fluoride referred to in the specification and claims of this invention is defined as the value measured by the following method. The diffraction of the wide-angle X-ray is performed by the crystal of the sample aluminum fluoride. In the equatorial line interference of the resulting X-ray diffraction pattern, the diffraction intensity in the vicinity of the peak at the diffraction angle of $$2\theta = 25.2° \pm 0.3°$$

is measured. The crystallite size of the aluminum fluoride is defined as the value D calculated from the half value width of the diffraction intensity curve in accordance with Scherrer's equation;

$$D = \frac{K\lambda}{\beta \cos \theta}$$

wherein $\beta$ is a half value width of the diffraction intensity curve which varies depending on the crystallite size,
$\lambda$ is a wavelength of the X-ray,
K is a constant (0.9), and
$\theta$ is a diffraction angle.

The above restriction of crystallite size is given to an aluminum fluoride before the mixing for the preparation of the catalyst of this invention, and it must be noted that the above restriction does not specify the crystallite size after the preparation of the catalyst.

Any aluminum fluoride may be used in the process of this invention, as far as it has a crystallite size of less than 1700 A. For instance, aluminum trifluoride hydrates prepared in accordance with the methods described in E. Band Am. Chem. Phys., (8) 1, 60 (1904), A. Mazzuchelli, Atti Accad Lincei, (5) 16i, 775 (1907) and W. F. Fhret, F. T. Frere, J. Am. Chem. Soc., 67, 64 (1945), and basic aluminum fluorides represented by the formula $Al(OH)lF_mO_n$ (wherein $l+m+2n=3$, $l=2.7-0.20$, $m=0.03-2.70$ and $n=1.2-0.0$) and prepared in accordance with the methods described in J. M. Cowley, T. R. Scott, J. Am. Chem. Soc., 70, 105 (1948) and R. L. Johnson, B. Siegel, Nature 210, 1256 (1966) are preferably used. As the second component of the catalyst of this invention preferably employed are aluminum florides prepared by calcining $\alpha$-$AlF_3 \cdot 3H_2O$, $\beta$-$AlF_3 \cdot 3H_2O$ or a mixture thereof at a temperature below 700° C., preferably in the range of from 200 to 500° C. Similarly effective alumina fluorides are also obtained by passing excess of anhydrous hydrogen fluoride through a reaction column packed with alumina, aluminum hydroxide or a mixture thereof at 200 to 500° C. or by passing excess of anhydrous hydrogen fluoride through a reaction column packed with aluminum chloride at 20 to 400° C.

In case such aluminum fluoride is used as one component of the catalyst of this invention, it is unnecessary to use an aluminum fluoride of a uniform chemical structure and catalytic effects can be likewise attained even by use of mixtures of the above cited aluminum fluorides, as far as the crystallite size thereof is less than 1700 A.

It is essential that the catalyst of this invention should comprise at least the above described first and second components. As is shown in Examples described hereinbelow, the disproportionation of toluene cannot be sufficiently performed when either of the above components is not contained in the catalyst. Though it is indefinite which of the two components acts as the main catalyst component in the catalyst of this invention, when an aluminum fluoride meeting the requirements specified in this inventoin is made coexistent with the dealkalized clinoptilolite, the catalytic activity of the system is extremely heightened as compared with the conventional catalyst systems, occurrence of undesired side reactions is reduced, and further the catalyst life is greatly prolonged.

In addition to the above described two components, the catalyst of this invention may contain at least one member selected from copper and silver as the third component. Copper and/or silver does not exhibit any catalytic acivity to the disproportionation reaction of toluene when used singly. However, when copper and/or silver is added as the third component to the dealkalized clinoptilolite and aluminum fluoride, the catalytic activity for the disproportionation is heightened as compared with the catalyst consisting of the two components alone, the decomposition of toluene is reduced and hence, amounts of carbon materials deposited on the catalyst are decreased. In addition, the catalyst life is further prolonged by the addition of copper and/or silver. Copper and/or silver is generally added in a form of a metal salt such as nitrates or chlorides. For instance, silver nitrate, cupric nitrate and cupric chloride are used.

The composition of the catalyst to be used in the process of this invention varies depending on the reaction conditions, but generally, in the case of the two-component catalyst, the composition is 20 to 99% by weight, preferably 40 to 90% by weight, of the dealkalized clinoptilolite component and 1 to 80% by weight, preferably 10 to 60% by weight, of the aluminum fluoride component. In the case of the three-component catalyst, the metallic component consisting of copper and/or silver is added to the above two-component catalyst in an amount of 0.05 to 30% by weight based on the above two-component catalyst. In case only copper is added, its preferred ratio is 5 to 10% by weight, and in case only silver is added, it is preferred to use it in an amount of 2 to 8% by weight.

The characteristic features of the invention process for the disproportionation of toluene employing the catalyst of the above composition will be detailed hereinbelow.

Generally speaking, in the disproportionation reaction of toluene a side reaction such as cracking of toluene or the resulting product is caused to occur, and the formation of lower hydrocarbons and the deposition of carbon materials are observed. In the specification of this invention, the ringloss is expressed in terms of the value (percent by weight) obtained by determining the amount formed of lower hydrocarbons contained in the purge gas by the customary gas chromatography and dividing the weight of the carbon contained in the lower hydrocarbons formed by the weight of the carbon contained in the toluene feed. This value indicates the degree of occurrence of the side reaction. In the specification of this invention, the quality of a catalyst used in the disproportionation is evaluated based on a combination of the highness of the catalytic activity and the easiness of occurrence of the side reaction, and as the criterion for evaluating the quality of the catalyst there is adopted the value of "catalysis index" defined as being the value obtained by dividing the value of "relative activity" of the catalyst by the value of "relative ringloss." The values of "relative activity" and "relative ringloss" referred to herein were calculated in accordance with the following procedures.

The standard catalyst of a dealkalizing degree of 93 mol percent was prepared by treating a clinoptilolite produced in California, U.S.A. with a 10 weight percent aqueous solution of ammonium chloride, washing it with water, drying it and subjecting it to a heat treatment at 500° C. By employing the so prepared standard catalyst, the disproportionation of toluene was conducted under the following reaction conditions:

Reaction temperature: 510° C.
Reaction pressure: 30 kg./cm.$^2$
Time factor $W/F$: 100 g. cat. hr./mol toluene [wherein W is the weight of the catalyst and F is the toluene feed rate (mol/hr.)].

As a result, the conversion of toluene to benzene and xylene was 37 mol percent and the ringloss was 1.26% by weight. These values were selected as standard values of the conversion and ringloss, respectively. The results shown in Table 1 were obtained by carrying out the disproportionation of toluene at a temperature of 510° C. and a pressure of 30 kg./cm.$^2$ in the presence of the standard catalyst while changing the time factor of $W/F$ variously and measuring the value of the conversion of toluene to benzene and xylene in each case.

Table 1.—Relation between the time factor $W/F$ of the standard catalyst and the conversion of toluene to benzene and xylene (510° C.; 30 kg./cm.$^2$).

| Time factor W/F (g. cat. hr./mol toluene): | Conversion of toluene to benzene and xylene (mol percent) |
|---|---|
| 50 | 20 |
| 80 | 30 |
| 100 | 37 |
| 140 | 45 |

The curve shown in FIG. 1 was obtained by plotting on a graph the relation between the time factor $W/F$ and the conversion of toluene to benzene and xylene. As will be described hereinbelow, this curve is used as a reference curve for calculating the value of the "relative activity."

By employing an optional sample catalyst, the disproportionation of toluene is carried out at a temperature of 510° C. and a pressure of 30 kg./cm.$^2$ under a prescribed value $a$ (g. cat. hr./mol toluene) of the time factor $W/F$, and then the conversion of toluene to benzene and xylene is measured. If the measured value of the conversion is $p$ mol percent, the value of the time factor $W/F$ corresponding to the conversion of $p$ mol percent is sought in the curve of FIG. 1. If the value of the time factor $W/F$ is $b$ (g. cat. hr./mol toluene), then the value of the relative activity is given by the following equation:

$$\text{Relative activity} = \frac{100 \times b}{a}$$

By employing the same catalyst, the disproportionation of toluene is performed at a temperature of 510° C. and a pressure of 30 kg./cm.$^2$ while the value of the time factor $W/F$ is so selected that the conversion of toluene to benzene and xylene will be 37 mol percent, and then the ringloss is measured. If the measured value of the ringloss is $c$ percent by weight, then the value of the relative ringloss is given by the following equation:

$$\text{Relative ringloss} = 100 \times c / 1.26$$

The great value of the catalysis index means that the catalyst is excellent in catalytic activities. As the value of the relative activity is great, the value of the catalysis index is great, and as the value of the relative ringloss is small, the value of the catalysis index is great.

The crystallie size of the aluminum fluoride to be used as one component of the catalyst of this invention is in a close relation to the catalytic acitvity and ringloss. As the crystallite size increases, the catalytic activity tends to decrease and the ringloss tends to increase.

FIG. 2 shows instances of the relation between the catalysis index and the crystallite size of the aluminum fluoride in the catalyst of this invention. The curve $a$ shows the catalysis index of the standard catalyst consisting of 100% by weight of clinoptilolite treated with ammonium chloride. The curve $b$ shows the catalysis index of a catalyst consisting of 20% by weight of aluminum fluoride and 80% by weight of clinoptilolite treated with ammonium chloride. The curve $c$ shows the catalysis index of a catalyst consisting of the above catalyst of curve $b$ and 3% by weight, based on said catalyst of curve $b$, of silver.

As is apparent from FIG. 2, in case an aluminum fluoride having a crystallite size of less than 1700 A. is used as one component of the catalyst of this invention, the catalyst exhibits a higher catalysis index than the standard catalyst consisting of the dealkalized clinoptilolite alone. On the other hand, in case an aluminum fluoride having a crystallite size of greater than 1700 A., the catalyst exhibits a catalysis index equivalent or rather inferior to that of the standard catalyst. Accordingly, it is an indispensable requirement that the aluminum fluoride to be used as one component of the catalyst of this invention should have a crystallite size of less than 1700 A.

The preparation of the catalyst of this invention will be explained hereinbelow.

In the case of the two-component catalyst, the preparation is performed by mixing a dealkalized clinoptilolite with an aluminum fluoride at a suitable mixing ratio, optionally shaping the mixture into pellets by employing a suitable means, for instance, a tablet machine, and thereafter calcining the mixture. In the case of the three-component catalyst, the preparation of the catalyst is performed by adding a mixture of a dealkalized clinoptilolite with an aluminum fluoride into an aqueous solution of a copper salt and/or silver salt to thereby impregnate the mixture with the aqueous solution, drying the mixture, optionally shaping it into pellets and thereafter calcining the mixture, whereby the third component consisting of copper and/or silver can be supported on the catalyst.

The calcination is generally performed in the air, but it is, of course, possible to carry out the calcination in an atmosphere of an inert gas such as nitrogen gas and carbon dioxide gas, or hydrogen gas. As the salt of copper or silver, it is possible to use various salts, but preferable results are obtained by the use of nitrates and chlorides, particularly nitrates. Of course, it goes without saying that other salts may be used. In this invention, the order of the steps of the preparation of the catalysts is not restricted to the above described orders alone, but it may be optionally varied.

In addition to the above described impregnating method, an ion-exchanging method is effective as the method of supporting copper and/or silver on the catalyst. This ion-exchanging method is easily conducted by treating a dealkalized clinoptilolite with aqueous solutions of desired copper and/or silver salts, removing the dealkalized clinoptilolite from the aqueous solution, drying it, and then mixing it with an aluminum fluoride. Also preferable is a method comprising treating a clinoptilolite with an aqueous acid solution containing desired metal cations and thereby concurrently carrying out the dealkalization of the clinoptilolite and the supporting of the metal components. In addition to the above described methods, the conventional methods such as the precipitating method, the mixing method and other known metal-supporting methods are equally applicable to this invention.

Another component may be further added to the catalyst system of this invention, as far as it is not concerned with the essence of the reaction of this ivention, and this feature is not deviated from the scope of this invention.

The calcination is conducted at a temperature of from 400 to 600° C., preferably from 450 to 550° C. The calcination time of more than 4 hours is usually preferred. It is usually preferred that pellets have a diameter of from about 3 to about 6 mm.

The disproportionation of toluene employing the so prepared catalyst may be carried out in the vapor or liquid phase in accordance with known fluidized bed methods or fixed bed methods, or other known methods. In view of the easiness in operation and the like, it is optimum to carry out the reaction in the vapor phase by employing a fixed bed. The reaction is conducted at a temperature of from 300 to 700° C., preferably from 350 to 550° C. The reaction is, of course, allowed to advance at temperatures higher than 700° C. but in such case the lowering in activity of the catalyst is frequently caused to occur. The reaction of this invention can be achieved by the co-existence of hydrogen gas. The hydrogen exhibits predominantly an effect of reducing amounts deposited of carbon materials. No particular restriction is given to the amount added of hydrogen, and a sufficient effect can be attained by having hydrogen present in the system in an amount of less than 50 mols per mol of toluene. A preferred mol ratio of hydrogen:toluene is in the range of from 10:1 to 20:1. Since the catalyst of this invention exhibits a very high activity to the disproportionation of toluene, the reaction is allowed to advance even under atmospheric pressure, but in the case of the industrial operation it is preferred to carry out the reaction under elevated pressures. A preferred reaction pressure is below 100 atmospheres, and a pressure of about 30 atmospheres is optimum. No particular restriction is given to the time factor $W/F$ (g. cat. hr./mol toluene) (wherein W is the weight of the catalyst and F is an amount fed of toluene), which defines the feed rate of toluene per unit weight of the catalyst. In order to obtain a high conversion of toluene it is preferred to carry out the reaction at a $W/F$ value of from about 50 to about 400, particularly from 100 to 200. But, no disadvantage is brought about when the reaction is carried out at a $W/F$ value of below 50.

The process of this invention will be specifically described hereinbelow by referring to examples, but the scope of this invention is not limited by these examples at all.

EXAMPLE 1

A clinoptilolite produced in California, U.S.A. was pulverized to form particles of less than 100 meshes and treated with a 10% aqueous solution of ammonium chloride at 90–100° C. for 4 days, following which the so treated clinoptilolite was washed sufficiently with water and dried at 120–150° C. for 8 hours. The dealkanization degree was 93 mol percent. An aluminum trifluoride having a crylstallite size of 350 A. was added to the above dealkalized clinoptilolite in an amount of 20% by weight based on the total weight, and they were mixed together. The mixture was shaped into pellents of 5 x 5 mm. $\phi$ by employing a tablet machine and calcined at 500° C. for 8 hours. The so obtained catalyst was named as catalyst A.

The catalyst A was dipped in a 5 weight percent aqueous solution of copper nitrate to have copper nitrate supported on the catalyst A in an amount of 5% by weight, calculated in terms of copper metal, based on the catalyst, followed by drying at 120–150° C. for 8 hours and calcining at 500° C. for 8 hours. The so obtained catalyst was named as catalyst B.

The catalyst A was dipped into a 3 weight percent aqueous solution of silver nitrate to have silver nitrate supported on the catalyst A in an amount of 3% by weight, calculated in terms of silver metal, based on the catalyst A, followed by drying at 120–150° C. for 8 hours and calcining at 500° C. for 8 hours. The so obtained catalyst was named as catalyst C.

By employing 21.8 g. each of the so obtained catalysts A, B and C, respectively, the disproportionation reaction of toluene was performed for 8 hours under the following conditions:

Reaction pressure: 30 kg./cm.$^2$
Reaction temperature: 510° C.
Feed rate of hydrogen: 97 N-l./hr. [N-l. is a unit for a value (liter) converted under conditions of 760 mm. Hg and 0° C.]
Feed rate of toluene: 20.1 g./hr.
Mol ratio of hydrogen to toluene: 20
Time factor $(W/F)$: 100 g. cat. hr./mol toluene The results are shown in Table 2 below.

TABLE 2

| Catalyst: | Conversion to benzene and xylene (mol, percent) | Relative ringloss | Catalysis index |
|---|---|---|---|
| A | 42 | 31 | 3.8 |
| B | 41 | 23 | 4.9 |
| C | 47 | 14 | 11.3 |

From the results given in Table 2 it is evident that the catalysts to be used in this invention are very excellent in catalytic properties.

When the catalyst B was continuously used for 30 days by performing the regeneration every three days by calcination at 500–600° C. in the air, or when the catalyst C was continuously used for 50 days by performing the same regeneration every 5 days, there was hardly observed any lowering of the catalytic activity in each case.

When the disproportionation of toluene was carried out under the same conditions as above employing the catalyst A except that the reaction temperature was adjusted to 450° C., the conversion of toluene to benzene and xylene was 38–40 mol percent.

Control 1.—By employing as a catalyst the dealkalized clinoptilolite of Example 1 alone instead of the catalysts of this invention, the disproportionation of toluene was carried out under the same conditions as in Example 1. The conversion of toluene to benzene and xylene was 37 mol percent. The relative ringloss being 100 and the catalysis index being 1.0.

Control 2.—When the disproportionation of toluene was carried out under the same conditions as in Example 1 by employing a catalyst prepared in the same manner as in the case of the preparation of the catalyst A of Example 1 except that an aluminum trifluoride having a crystallite size of 2200 A. was used as the aluminum fluoride component, the conversion of toluene to benzene and xylene was 31 mol percent, the relative ringloss being 125 and the catalysis index being 0.62.

Control 3.—Catalysts D and E were prepared in the same manner as in the case of the preparation of the Catalyst A except using cadmium fluoride and nickel fluoride, respectively, instead of the aluminum trifluoride component of the catalyst A of Example 1. By employing these catalysts D and E, respectively, the disproportionation of toluene was conducted under the same conditions as in Example 1. The results are shown in Table 3.

TABLE 3

| Catalyst: | Conversion of toluene to benzene and xylene (mol, percent) | Relative ringloss |
|---|---|---|
| D | 38 | 580 |
| E | 18 | 4,800 |

From the results given in Table 3 it is evident that the ringloss of each of catalysts D and E is very high and such catalysts are not comparable to the catalysts of this invention.

EXAMPLE 2

A clinoptilolite produced at Itaya, Yamagata prefecture, Japan was pulverized to particles of less than 100 meshes, and treated with a 10% aqueous solution of ammonium nitrate at 90–100° C. for 4 days, following which the so treated clinoptilolite was sufficiently washed with water and dried at 120–150° C. for 8 hours. The dealkalization degree of the so treated clinoptilolite was 94 mol percent. An aluminum trifluoride having a crystallite size of 1100 A. was added to the so treated clinoptilolite in an amount of 20% by weight based on the total weight, and they were mixed together. The mixture was shaped into pellets of 5 x 5 mm. φ and calcined at 500° C. for 8 hours. The so obtained catalyst was named as catalyst F.

The catalyst G was prepared by dipping the catalyst F into a 5 weight percent aqueous solution of silver nitrate to have silver nitrate supported in the catalyst F in an amount of 5% by weight, calculated in terms of silver metal, based on the catalyst F, followed by drying at 120–150° C. for 8 hours and calcining at 500° C. for 8 hours.

The catalyst H was prepared by dipping the catalyst F into a 5 weight percent aqueous solution of silver nitrate to have silver nitrate supported in the catalyst F in an amount of 5% by weight, calculated in terms of silver metal, based on the catalyst F, followed by drying at 120–150° C. for 8 hours and calcining at 500° C. for 8 hours.

By employing 21.8 g. each of the so obtained catalysts F, G and H, respectively, the disproportionation of toluene was carried out for 8 hours at a pressure of 30 kg./cm.$^2$, a temperature of 510° C., a hydrogen feed rate of 97 N-l./hr., a toluene feed rate of 20.1 g./hr., a hydrogen-to-toluene mol ratio of 20 and a time factor $W/F$ of 100 g. cat. hr./mol toluene. The results are shown in Table 4.

TABLE 4

| Catalyst: | Conversion of toluene to benzene and xylene (mol, percent) | Relative ringloss | Catalysis index |
|---|---|---|---|
| F | 37 | 59 | 1.7 |
| G | 34 | 53 | 1.6 |
| H | 40 | 27 | 4.0 |

From the results given in Table 4 it is evident that the catalysts of this invention are very excellent in catalytic properties.

Control 4.—By employing a catalyst prepared in the same manner as in the case of the preparation of the catalyst G of Example 2 except using the dealkalized clinoptilolite free of the aluminum trifluoride component instead of the catalyst F, the disproportionation of toluene was conducted under the same conditions as in Example 2. The conversion of toluene to benzene and xylene was 35 mol percent, the ringloss being 120 and the catalysis index being 0.75.

EXAMPLE 3

A clinoptilolite was pulverized to particles of less than 100 meshes, and treated with a 3 N aqueous solution by hydrochloric acid at 90–100° C. for 5 days, following which the so treated clinoptilolite was washed sufficiently with water and dried at 120–150° C. for 8 hours. An aluminum trifluoride having a crystallite size of 350° A. was added to the so treated clinoptilolite in an amount of 20% by weight based on the total weight and they were mixed together. The mixture was shaped into pellets of 5 x 5 mm.φ and calcined at 500° C. for 8 hours. The calcined product was dipped into a 5 weight percent aqueous solution of silver nitrate to have silver nitrate supported in an amount of 5% by weight, calculated in terms of silver metal, based on the dealkalized clinoptilolite and aluminum trifluoride components, followed by drying at 120–150° C. for 8 hours and calcining at 500° C. for 8 hours.

By employing 21.8 g. of the so obtained catalyst, the disproportionation of toluene was carried out for 8 hours at a reaction temperature of 510° C., a pressure of 30 kg./cm.$^2$, a hydrogen feed rate of 97 N-l./hr., a toluene feed rate of 20.1 g./hr., a hydrogen-to-toluene mol ratio of 20 and a time factor $W/F$ of 100 g. cat. hr./mol toluene. The conversion of toluene to benzene and xylene was 37 mol percent, the ringloss being 9 and the catalysis index being 11.1.

EXAMPLE 4

By employing a catalyst prepared in the same manner as in the case of the preparation of the catalyst of Example 3 except that a basic aluminum fluoride

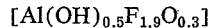

[Al(OH)$_{0.5}$F$_{1.9}$O$_{0.3}$]

having a crystallite size of 450° A. was used instead of the aluminum fluoride and was added to the clinoptilolite in an amount of 30% by weight based on the total weight, the disproportionation of toluene was carried out under the same conditions as in Example 3. The conversion of toluene to benzene and xylene was 33 mol percent, the relative ringloss being 18 and the catalysis index being 4.5.

What we claim is:

1. A process for the preparation of benzene and xylene by the disproportionation of toluene comprising contacting toluene with a catalytic amount of a catalyst under heating, characterized in that the catalyst is prepared by mixing a dealkalized clinoptilolite with aluminum trifluoride, the said aluminum fluoride having a crystallite size of less than 1700 A. before the mixing for the preparation of the catalyst, and that the said disproportionation is carried out in the presence of hydrogen.

2. The process in accordance with claim 1, wherein the catalyst comprises 20 to 99% by weight, based on the total weight of the catalyst, of the dealkalized clinoptilolite and 1 to 80% by weight, based on the total weight of the catalyst of the aluminum fluoride.

3. The process in accordance with claim 1, wherein the catalyst comprises 40 to 90% by weight, based on the total weight of the catalyst, of the dealkalized clinoptilolite and 10 to 60% by weight, based on the total weight of the catalyst, of the aluminum fluoride.

4. The process in accordance with claim 1, wherein the dealkalized clinoptilolite is prepared by substituting at least 50 mol percent of alkali metals and alkaline earth metals contained in the starting clinoptilolite by hydrogen.

5. The process in accordance with claim 1, wherein the aluminum fluoride is an aluminum trifluoride hydrate.

6. The process in accordance with claim 1, wherein toluene is contacted with the catalyst at a temperature of from 300 to 700° C.

7. The process in accordance with claim 6, wherein hydrogen is made present in the system at a hydrogen-to-toluene mol ratio ranging from 10 to 20.

8. The process in accordance with claim 7, wherein the contact of toluene with the catalyst is conducted at a ime facor $W/F$ of from 50 to 400 (g. cat. hr./mol toluene).

9. A process for the preparation of benzene and xylene by the disproportionation of toluene comprising contacting toluene with a catalytic amount of a catalyst under heating, characterized in that the catalyst is prepared by mixing a dealkalized clinoptilolite and aluminum trifluoride with at least one member selected from the group consisting of copper and silver, the said aluminum fluoride having a crystallite size of less than 700 A. before the mixing for the preparation of the catalyst, and that the said disproportionation is carried out in the presence of hydrogen.

10. The process in accordance with claim 9, wherein the catalyst comprises 20 to 99% of the dealkalized clinoptilolite, 1 to 80% of the aluminum fluoride and 0.05 to 30% of at least one group selected from the group consisting of copper and silver, all the percentages being by weight based on the weight of the dealkalized clinoptilolite and aluminum fluoride components.

11. The process in accordance with claim 9, wherein the catalyst comprises 40 to 90% of the dealkalized clinoptilolite, 10 to 60% of the aluminum fluoride and 5 to 10% of copper, all the percentage being by weight based on the weight of the dealkalized clinoptilolite and aluminum fluoride components.

12. The process in accordance with claim 9, wherein the catalyst comprises 40 to 90% of the dealkalized clinoptilolite, 10 to 60% of the aluminum fluoride and 2 to 8% of silver, all the percentage being by weight based on the weight of the dealkalized clinoptilolite and aluminum fluoride components.

13. The process in accordance with claim 9, wherein the dealkalized clinoptilolite is prepared by substituting at least 50 mol percent of alkali metals and alkaline earth metals contained in the starting clinoptilolite by hydrogen.

14. The process in accordance with claim 9, wherein the aluminum fluoride is an aluminum trifluoride hydrate.

15. The process in accordance with claim 9, wherein toluene is contacted with the catalyst at a temperature of from 300 to 700° C.

16. The process in accordance with claim 15, wherein hydrogen is made present in the system at a hydrogen-to-toluene mol ratio ranging from 10 to 20.

17. The process in accordance with claim 16, wherein the contact of toluene with the catalyst is conducted at a time factor $W/F$ of from 50 to 400 (g. cat. hr./mol toluene).

References Cited

UNITED STATES PATENTS

| | | | |
|---|---|---|---|
| 3,354,078 | 11/1967 | Miale et al. | 208—120 |
| 3,413,374 | 11/1968 | Sato et al. | 260—672 |
| 3,477,964 | 11/1969 | Fishel | 252—442 |

DELBERT E. GANTZ, Primary Examiner

G. E. SCHMITKONS, Assistant Examiner

U.S. Cl. X.R.

252—442, 455